United States Patent
Schallmeier

(10) Patent No.: US 10,315,478 B2
(45) Date of Patent: Jun. 11, 2019

(54) BONDED GUIDE TUBE AND BELLOW ASSEMBLY FOR AIR SPRING

(71) Applicant: Continental Automotive Systems, Inc., Auburn Hills, MI (US)

(72) Inventor: Christian Schallmeier, Leutkirch (DE)

(73) Assignee: Continental Automotive Systems, Inc., Auburn Hills, MI (US)

(*) Notice: Subject to any disclaimer, the term of this patent is extended or adjusted under 35 U.S.C. 154(b) by 0 days.

(21) Appl. No.: 15/485,761

(22) Filed: Apr. 12, 2017

(65) Prior Publication Data

US 2017/0217273 A1    Aug. 3, 2017

Related U.S. Application Data

(62) Division of application No. 14/488,333, filed on Sep. 17, 2014, now Pat. No. 9,636,962.

(51) Int. Cl.
| | | |
|---|---|---|
| B60G 11/27 | (2006.01) | |
| B29C 65/48 | (2006.01) | |
| F16F 9/04 | (2006.01) | |
| F16F 9/05 | (2006.01) | |
| F16F 9/43 | (2006.01) | |
| B29K 63/00 | (2006.01) | |
| B29L 31/30 | (2006.01) | |
| F16F 13/00 | (2006.01) | |

(52) U.S. Cl.
CPC ............ B60G 11/27 (2013.01); B29C 65/483 (2013.01); F16F 9/0436 (2013.01); F16F 9/0454 (2013.01); F16F 9/057 (2013.01); F16F 9/43 (2013.01); *B29K 2063/00* (2013.01); *B29L 2031/3055* (2013.01); *B60G 2202/152* (2013.01); *B60G 2202/32* (2013.01); *B60G 2206/424* (2013.01); *B60G 2206/70* (2013.01); *B60G 2206/821* (2013.01); *F16F 13/002* (2013.01); *F16F 2226/042* (2013.01)

(58) Field of Classification Search
CPC ......... B60G 2202/152; B60G 2206/821; F16F 2226/042
See application file for complete search history.

(56) References Cited

U.S. PATENT DOCUMENTS

| | | | |
|---|---|---|---|
| 5,460,354 A | 10/1995 | Easter | |
| 8,272,627 B2 | 9/2012 | Oldenettel et al. | |

(Continued)

FOREIGN PATENT DOCUMENTS

| | | |
|---|---|---|
| DE | 29823508 | 8/1999 |
| DE | 29823508 U1 | 8/1999 |

(Continued)

OTHER PUBLICATIONS

DE102004021594 Machine Translation (Year: 2005).*

(Continued)

*Primary Examiner* — Christopher T Schatz

(57) ABSTRACT

An air spring includes a bellow at least partially delimiting at least one working chamber that is constructed and arranged to be filled with compressed air. A guide tube surrounds at least a portion of the bellow. A bonding agent solely fixes a portion of the bellow to the guide tube. A piston is associated with the bellow. The bellow is constructed and arranged to roll with respect to an outer surface of the piston and an inner surface of the guide tube.

11 Claims, 3 Drawing Sheets

(56) References Cited

U.S. PATENT DOCUMENTS

| 8,474,798 B2 | 7/2013 | Jeischik | |
|---|---|---|---|
| 2007/0126163 A1* | 6/2007 | Leonard | F16F 9/05 |
| | | | 267/64.27 |
| 2010/0001446 A1 | 1/2010 | Oldenettel et al. | |
| 2013/0300074 A1* | 11/2013 | Koeske | B60G 11/27 |
| | | | 280/6.157 |

FOREIGN PATENT DOCUMENTS

| DE | 2004021594 A1 | 12/2005 | |
|---|---|---|---|
| DE | 102004021594 | 12/2005 | |
| DE | 102004021594 A1 * | 12/2005 | ............ F16F 9/0445 |
| DE | 102008015610 | 10/2009 | |
| DE | 102008015610 A1 | 10/2009 | |
| EP | 0969222 | 1/2000 | |
| EP | 2407686 | 1/2012 | |
| EP | 2407686 A2 | 1/2012 | |
| WO | 201310470 A1 | 7/2013 | |
| WO | 2013102470 | 7/2013 | |

OTHER PUBLICATIONS

European Search Report for application No. 15184178.0-1755. dated Feb. 24, 2016.
European Patent Office Search Report dated Feb. 24, 2016.

* cited by examiner

BONDED GUIDE TUBE AND BELLOW ASSEMBLY FOR AIR SPRING

FIELD

This invention relates to a pneumatic spring or air spring for a vehicle and, in particular, to a bellow molded into a guide tube of the air spring.

BACKGROUND

A conventional air spring is a device that is arranged between a vehicle body and chassis. The typical air spring has at least one working space that is filled with compressed air, wherein at least one working space is, in each case, delimited at least partially by movable walls in the form of roll-type or fold-type bellow. The working spaces are connected to one another via flow ducts, and the flow ducts have throttle valves.

FIG. 1 shows a portion of a conventional air spring, generally indicated at 10, for a motor vehicle. The air spring 10 has a working chamber 12 filled with compressed air that is at least partially delimited by rolling bellow 14, which forms a rolled fold 14a. When the vehicle experiences spring compression and spring extension, the rolling bellow 14 rolls both on a rotationally symmetrical contour of a roll-off piston 16 and on the inner surface of a guide tube 18. At its ends 20, 22, the rolling bellow 14 is fastened to the connecting parts by clamping rings 24, 26. The air spring 10 has a centrally arranged hydraulic damper including a piston rod 28 connected via and by the air spring cover (not shown) to the bodywork. The piston rod 28 is connected to a damper cylinder 30 that is connected, via a connecting flange (not shown) to a wheel support of the chassis in the conventional manner.

The guide tube 18 is fastened directly to the rolling bellow 14 by being crimped to a support ring 32. Thus, the rolling bellow 14 is thus firmly positioned and fixed relative to the guide tube 18. However, this process step requires preassembly steps and an additional part (support ring), which increase cost and assembly time.

Thus, there is a need to eliminate the crimping process of the guide tube and eliminate a support ring by bonding the rolling bellow directly onto the guide tube during molding of the bellow.

SUMMARY

An objective of the invention is to fulfill the need referred to above. In accordance with the principles of an embodiment, this objective is achieved by an air spring that includes a bellow at least partially delimiting at least one working chamber that is constructed and arranged to be filled with compressed air. A guide tube surrounds at least a portion of the bellow. A bonding agent solely fixes a portion of the bellow to the guide tube. A piston is associated with the bellow. The bellow is constructed and arranged to roll with respect to an outer surface of the piston and an inner surface of the guide tube.

In accordance with another aspect of an embodiment, a method secures a portion of a bellow to a guide tube of an air spring. The method places the bellow, in an unformed state, in an outer mold form along with the guide tube. A bonding agent is provided on a portion of an inner surface of the guide tube at a location where the bellow is to be fixed to the guide tube. The bellow is pressed against the outer mold to form the bellow and the bellow is pressed against a portion of the guide tube so that the bonding agent contacts the guide tube and a portion of a peripheral surface of the bellow. The bellow and bonding agent are cured. After curing, the outer mold form is removed, with the bonding agent fixing the formed bellow directly to the guide tube.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 2:
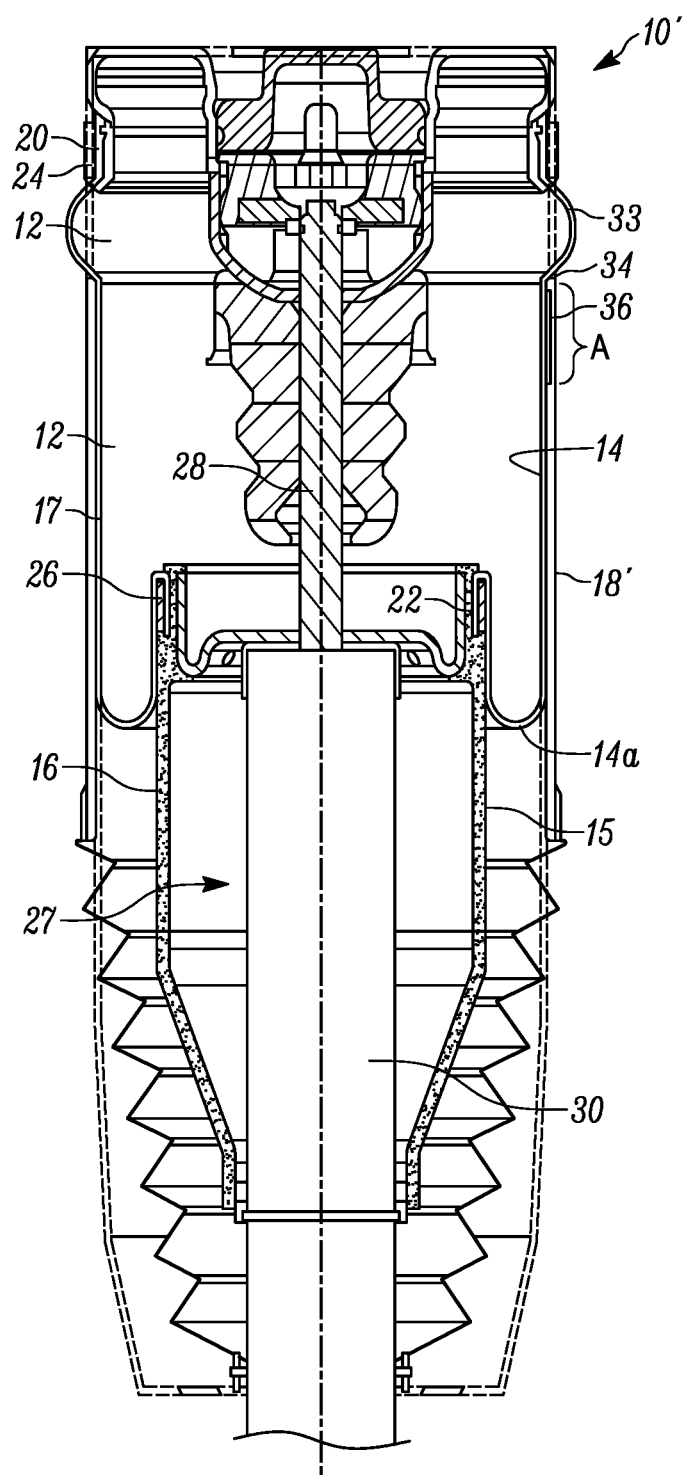
FIG. 2 is a view of an air spring having the rolling bellow bonded directly onto the guide tube in accordance with an embodiment.

With reference to FIG. 2, a portion of an air spring is shown, generally indicated at 10', for a motor vehicle. The air spring 10' can be of the type disclosed in U.S. Pat. No. 8,474,798, the content of which is hereby incorporated by reference into this specification. Thus, the air spring 10' has at least one working chamber 12 filled with compressed air, which is at least partially delimited by an elastomer rolling bellow 14 that forms a rolled fold 14a. When the vehicle experiences spring compression and spring extension, the rolling bellow 14 rolls both on a rotationally symmetrical outer surface 15 of a roll-off piston 16 and on an inner surface 17 of a preferably metal guide tube 18'. Thus, the guide tube 18' surrounds a portion of the rolling bellow 14. At its ends 20, 22, the rolling bellow 14 is fastened to the connecting parts by clamping rings 24, 26. The air spring 10' has a centrally arranged hydraulic damper structure, generally indicated at 27, including a piston rod 28 preferably connected via an air spring cover (not shown) to the bodywork. The piston rod 28 is connected to a damper cylinder 30 that is connected, via a connecting flange (not shown) to a wheel support of the chassis in the conventional manner. The conventional cardanic fold 33 of the bellow 14 is adjacent to an end 34 of the guide tube 18'.

Figure 1:
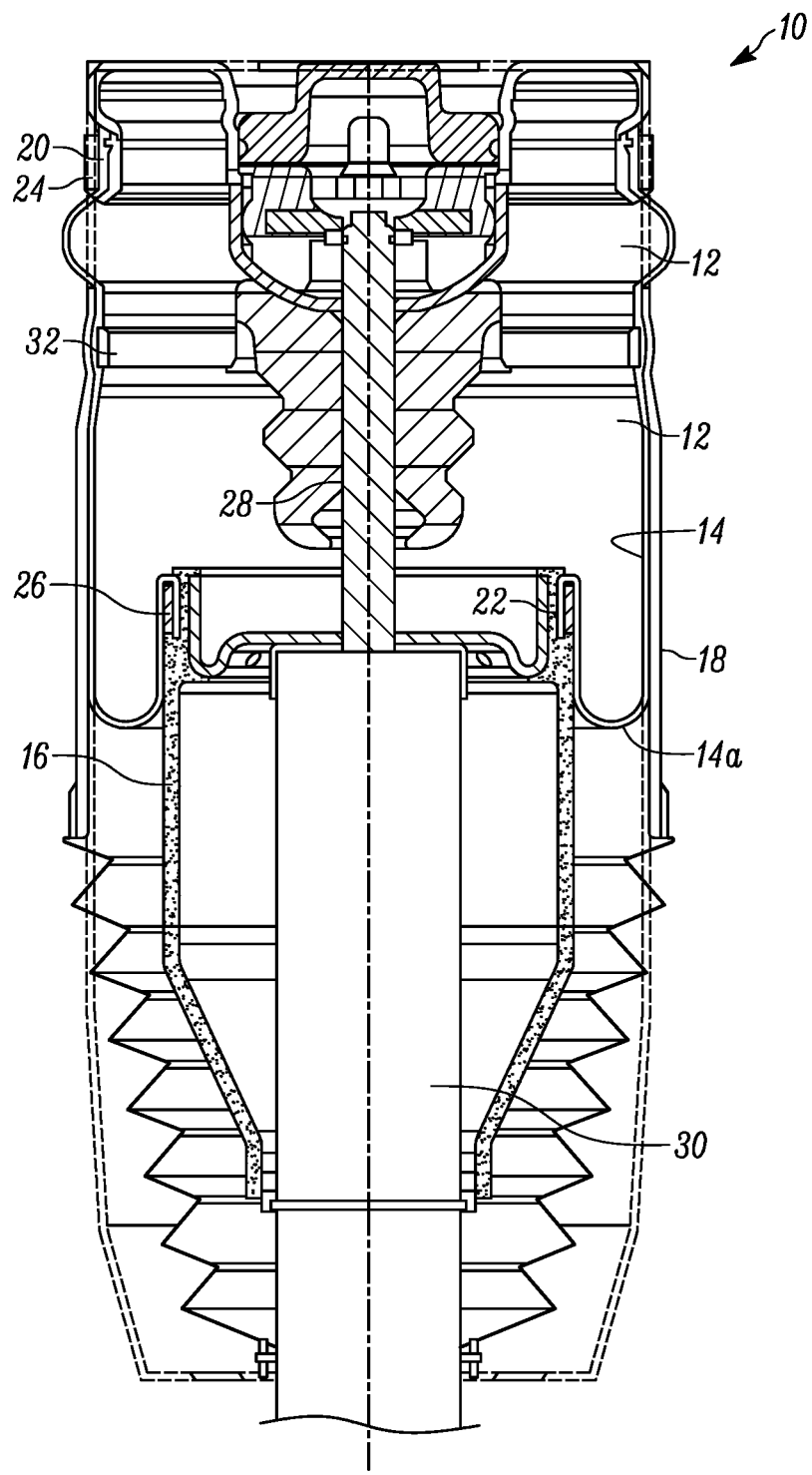
FIG. 1 is a view of a conventional air spring having a guide tube crimped to a support ring, thereby fixing a rolling bellow to the guide tube.

Instead of crimping the guide tube 18' to a support ring to fix the rolling bellow 14, the bellow 14 is fixed directly to the guide tube 18' solely by a bonding agent 36, generally adjacent to the cardanic fold 33. The bonding agent 36 can be any suitable agent such as adhesive, epoxy, rubber cement, etc. The bonding area is shown at A in FIG. 2. With the embodiment, advantageously, the support tube 32 of FIG. 1 is no longer required, nor is a crimping step. Conventionally, the bellow 14 is molded in a manufacturing step. Thus, the embodiment makes use of this molding step to bond the bellow 14 to the guide tube 18' as explained below.

Figure 3:
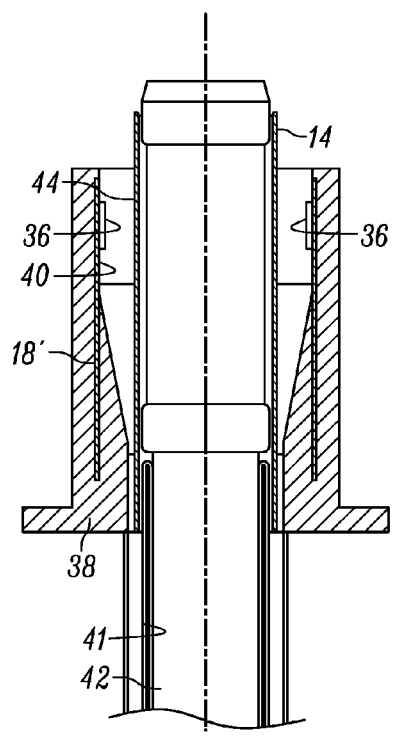
FIG. 3 is a view of the rolling bellow and guide tube in an outer mold form in accordance with an embodiment.
Figure 4:
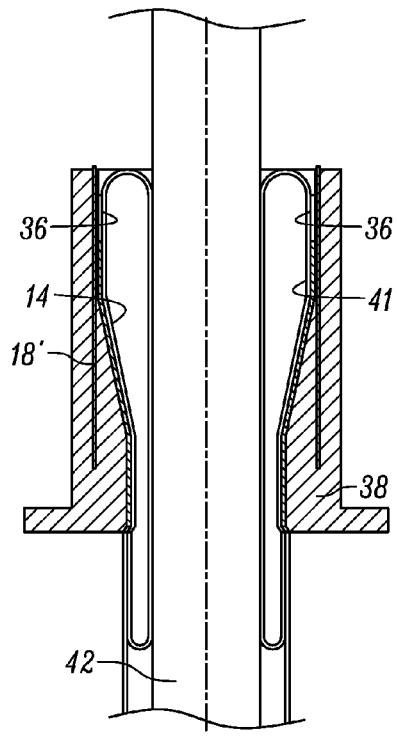
FIG. 4 is a view of the rolling bellow of FIG. 3 now shown pressed against the outer mold, with the guide tube acting as an outer mold during a curing process and with the rolling bellow bonded to the guide tube in accordance with an embodiment.

With reference to FIG. 3, the unformed bellow 14 is placed in a conventional outer mold form 38 along with the guide tube 18'. The bonding agent 36 is provided on a portion of an inner surface 40 of the guide tube 18' at a location where the bellow 14 is to be fixed to the guide tube 18'. As shown in FIG. 4, the bellow 14 is pressed by an inflatable portion 41 of a mold member 42 against the outer mold form 38 in the conventional manner to from the bellow and, in accordance with an embodiment, the bellow 14 is also pressed against a portion of the guide tube 18' so that the bonding agent 36 contacts the guide tube 18' and a portion of a peripheral surface 44 of the bellow 14. The bellow and bonding agent 36 is then cured, with the guide tube 18' acting as an outer mold during the curing process. Once cured, the outer mold form 38 is removed, with the bonding agent 36 fixing the formed bellow 14 directly to the guide tube 18'.

Thus, the use of the bonding agent 36 during the bellow molding process eliminates the need for the conventional support ring and crimping process, thereby reducing parts and cost and also reducing a cumbersome manufacturing process of an air spring.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. An air spring comprising:
    a bellow at least partially delimiting at least one working chamber that is constructed and arranged to be filled with compressed air, the bellow including a rolled fold;
    a metal guide tube surrounding at least a portion of the bellow;
    a bonding agent solely fixing a portion of the bellow to the guide tube, wherein the bonding agent is separate material from the bellow; and
    a piston associated with the bellow, with the bellow being constructed and arranged to roll with respect to an outer surface of the piston and an inner surf ace of the guide tube, wherein the bellow includes a cardanic fold and the portion of the bellow that is fixed by the bonding agent to the guide tube is disposed adjacent to the cardanic fold, wherein the rolled fold of the bellow is spaced apart from the cardanic fold and the metal guide tube extends from the cardanic fold past the rolled fold.

2. The air spring of claim 1, wherein the bonding agent is an adhesive.

3. The air spring of claim 1, wherein the bonding agents is epoxy.

4. The air spring of claim 1, wherein the bonding agent fixing the portion of the bellow to the guide tube is applied over less than the full length of the guide tube.

5. The air spring of claim 1, wherein the bonding agent is disposed between the bellow and the metal guide tube within a region adjacent the cardanic fold.

6. The air spring of claim 1, including a damper structure disposed within the piston.

7. The air spring of claim 6, wherein the damper structure includes a piston rod that extends from a damper cylinder.

8. The air spring of claim 1, including end clamps connecting ends of the bellows to connecting parts.

9. An air spring comprising:
    a bellow at least partially delimiting at least one working chamber that is constructed and arranged to be filled with compressed air, the bellow including distal ends secured to connecting parts by end clamps and including a cardanic fold formed adjacent one of the end clamps;
    a metal guide tube surrounding at least a portion of the bellow;
    a bonding agent solely fixing the metal guide tube to the bellows, wherein the bonding agent is a separate material from the bellow and disposed in a region having a length less than a length of the metal guide tube, wherein the region is disposed adjacent the cardanic fold of the bellow; and
    a piston associated with the bellow, with the bellow being constructed and arranged to roll with respect to an outer surface of the piston and an inner surf ace of the guide tube.

10. The air spring of claim 9, wherein the bellow includes a rolled fold spaced apart from the cardanic fold and the metal guide tube extends from the cardanic fold past the rolled fold.

11. The air spring of claim 10, including a damper structure disposed within the piston.

* * * * *